United States Patent [19]

Mansukhani

[11] 4,259,675
[45] Mar. 31, 1981

[54] JET INK PROCESS

[75] Inventor: Ishwar R. Mansukhani, Neenah, Wis.

[73] Assignee: Whittaker Corporation, Los Angeles, Calif.

[21] Appl. No.: 108,366

[22] Filed: Dec. 31, 1979

Related U.S. Application Data

[63] Continuation of Ser. No. 17,241, Mar. 5, 1979, abandoned.

[51] Int. Cl.$^3$ ............................................. C08D 11/02
[52] U.S. Cl. ........................................ 346/1; 106/20; 106/22; 106/23; 346/75
[58] Field of Search ............................ 106/22, 20, 23

[56] References Cited

U.S. PATENT DOCUMENTS

| | | | |
|---|---|---|---|
| 3,705,045 | 12/1972 | Nadolski | 106/22 |
| 4,026,713 | 5/1977 | Sambucetti et al. | 106/22 |
| 4,196,007 | 4/1980 | Mansukhani | 106/22 |

*Primary Examiner*—Morton Foelak
*Attorney, Agent, or Firm*—Henry M. Bissell

[57] ABSTRACT

An ink composition for use in jet printing comprising an aqueous solution of a water-soluble dye and a humectant consisting of at least one member of the group consisting of organic phosphonates and organic phosphites.

3 Claims, No Drawings

JET INK PROCESS

This is a continuation of application Ser. No. 017,241 filed Mar. 5, 1979, now abandoned.

The invention relates jet ink and particularly an aqueous jet printing ink for printing with a jet ink printing system. One of the main problems with ink jet inks is that, when the ink jet printer is not being used for an extended period of time, ink in the nozzle dries out causing plugging of the nozzle. This invention comprises a new class of liquids which when used in proper amounts alone or in combination with other humectants, overcome nozzle clogging problem.

The principle underlying jet printing with ink is based on driving ink through a fine nozzle of metal or glass, so that uniform ink droplets are ejected from the nozzle tip. These ink droplets are electrostatically deflected with a deflecting electrode, arranged in front of the nozzle, so that symbols are printed with a preliminarily determined matrix. In this printing process the ink in the nozzle is divided in fine ink droplets and the direction of the ink jet is controlled by deflecting plates or through nozzle movement. This printing process is highly dependent on the properties on the ink. The ink must be capable of forming stable ink droplets under pressure and under an electrical field, which have a high deflection sensitivity. Further, the ink must readily emerge from the nozzle. In addition, clogging of the nozzle by drying ink must be prevented. Commercial nozzle jet inks are divided in aqueous and nonaqueous inks. Nonaqueous inks have the disadvantage of low stability ink droplets because of low surface tension. As a result, while in flight the ink droplets form a fog. In addition, such a nonaqueous ink has a high electrical resistance and a low deflecting sensitivity. At the same time, these ink droplets are particularly unstable under a high electrical charge. Consequently, it has been difficult to print clear and distinct symbols with this method.

The concepts of the present invention reside in a new and improved ink composition suitable for use in jet printing comprising an aqueous solution of a water-soluble dye and a humectant consisting of at least one member of the group consisting of organic phosphonates and organic phosphites.

Dialkyl alkylphosphonates are a group of stable organic phosphorus esters possessing unique properties and offering considerable potential for commercial exploitation. Dialkyl alkylphosphonates include:
dimethyl methylphosphonate
diethyl ethylphosphonate
dibutyl butylphosphonate
bis(2-ethylhexyl) 2-ethylhexylphosphonate These materials are neutral esters of phosphonic acids and are clear, colorless, mobile liquids with very mild, characteristic odors. They are similar in many respects to the trialkyl phosphates which have found a wide variety of commercial applications. The significant structural difference between the two is that the phosphonates have one alkyl radical attached directly to the phosphorus atom by a carbon-phosphorus bond. This structural difference gives the phosphonates several advantages over the phosphates; among these are higher flash points, lower toxicity, and greater thermal stability. Other significant differences in comparison with the corresponding phosphates are that the phosphonates have one less oxygen atom in the molecule, lower molecular weights, lower boiling points, higher refractive indexes, and somewhat different solubility characteristics. Phosphonates and phosphates are very similar in appearance, odor, and a number of other physical characteristics.

Dialkyl alkylphosphonates, represented by the structure $RP(O)(OR)_2$, are derivatives of pentavalent phosphorus. They are classified as neutral esters and undergo few chemical reactions. Characteristically they are resistant to oxygen and oxidizing agents; neither sulfur nor halogens, at ordinary temperatures, have any marked effect.

In general, dialkyl alkylphosphonates are resistant to reducing agents; sodium amalgam and aluminum amalgam seem to produce little effect on them. More powerful reducing agents convert them to a variety of products, but information on these reactions is scant.

As a general class they are resistant to hydrolysis although the lower molecular weight members are only moderately resistant. Under forcing conditions in acid media, the esters may be converted into the corresponding phosphonic acids, typically crystalline solids. In basic media, they slowly lose one alkyl group and this reaction is used as a synthetic method for the preparation of the half-esters of phosphonic acids.

The dialkyl alkylphosphonates may be smoothly converted to phosphonic dichlorides by the action of phosphorus pentachloride or thionyl chloride under comparatively mild conditions. Similar reactions could be expected with analogous brominating agents.

Replacment of one or more of the ester groupings of the dialkyl alkylphosphonates by a phosphorus-containing radical, to form pyrophosphonates and related substances, may be accomplished by moderate heating with an organic halophosphorus derivative.

Lower members of the dialkyl alkylphosphonate series react readily to alkylate neutral and anionic nucleophiles. These reactions take place under mild conditions, preferably without solvent other than the phosphonate itself with the loss of but one ester alkyl and with the formation of an ester-salt.

It has been found that printing inks formulated in accordance with this invention have the desired viscosity for use in jet printing, and that the viscosity of the composition is subject to little variation with use as water is lost by evaporation during recirculation of the ink composition through the jet printer. In addition, the humectant of this invention substantially prevents or minimizes tip drying of the printing ink in the orifice or nozzle during down time of the printer, such as when the printer is shut down over night.

The total amount of the humectant mixture employed in the ink composition of the present invention can be varied within wide limits as dictated by the viscosity considerations of the ink composition.

As the coloring material in the ink composition of the invention, use should be made of a water-soluble dye or mixture of dyes. The use of pigments or other forms of particulate matter is preferably avoided since such materials tend to clog the very small orifice of the jet printer.

Preferred dyes of the present invention are the commercially available direct dyes which generally contain an ionizable inorganic salt, such as Glauber salts, or sodium chloride which has been added during manufacture in order to standardize the dye lot. The inorganic material thus renders the dye conductive whereby the ink jet is capable of being deflected in an electromagnetic field during jet printing. Such direct dyes are well known to those skilled in the art and are commercially available, as represented by the C.I. direct black 38 dyes (e.g., Direct Black GW marketed by the Tenneco Color Division of Tenneco Chemicals and Capamine Black ESA marketed by the Capital Color and Chemical Co.). Such dyes are available in a number of colors, any one or more of which can be used in the practice of the invention. If use is made of a pure dye containing no ionizable salt, the desired conductivity can be achieved by adding 0.5% ionizable salt, such as one of the types described, to the composition. For a further description of such well known dyes, reference can be made to the Color Index, published by the Society of Dyes and Colorists in cooperation with the American Association of Textile Chemists and Colorists (1957).

The ink composition of the present invention can be prepared by thoroughly mixing the components to insure uniform mixing and complete dissolution of the water-soluble dye, and then filtering the resulting composition to remove any particulate contamination. As will be apparent to those skilled in the art, filtration of the composition after mixing the components is highly desirable in order to remove from the ink composition particulate matter, such as contamination or undissolved dye, which might otherwise serve to clog or obstruct the jet of a jet printer during use. It is frequently preferred to filter the composition of the invention to remove particulate matter having a diameter greater than 2 microns, and preferably 1 micron, to insure that obstruction of the jet of the jet printer will be avoided.

The invention is described in the following on the basis of exemplified embodiments.

While there are disclosed below but a limited number of embodiments of the invention herein presented, it is possible to produce still other embodiments without departing from the inventive concepts herein disclosed. Various other modifications will be readily apparent to those skilled in the art.

The following novel composition is expressed in parts by weight:

EXAMPLE 1

| Pontamine black SP-33 | 25.00 |
|---|---|
| distilled water | 55.00 |
| 1-4 butynediol (35% aqueous solution) | 10.00 |
| diethylmethyl phosphonate | 10.00 |
| | 100.00 |

EXAMPLE 2

| Pontamine black SP-33 | 25.00 |
|---|---|
| distilled water | 55.00 |
| 1-4 butyndiol (35% aqueous solution) | 10.00 |
| di-isopropyl hydrogen phosphite | 10.00 |
| | 100.00 |

EXAMPLE 3

| Pontamine black SP-33 | 30.00 |
|---|---|
| distilled water | 55.00 |
| Antiblaze 19* | 75.00 |
| | 160.00 |

*Antiblaze 19 flame retardant is a unique flame retardant additive for textile and plastic products. Its chemical composition is given below:

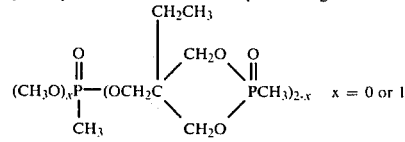

EXAMPLE 4

| Pontamine black SP-33 | 10.00 |
|---|---|
| dimethyl methyl phosphonate | 10.00 |
| distilled water | 80.00 |
| | 100.00 |

EXAMPLE 5

| Pontamine black SP-33 | 13.30 |
|---|---|
| dimethyl methyl phosphonate | 86.70 |
| | 100.00 |

Inks with other dyes have been made.

What is claimed is:

1. In a process for information recording comprising producing a fine jet of colored aqueous liquid, directing the jet of colored liquid onto a recording medium, and modulating the density of the jet by applying an electric field in accordance with information to be recorded, the improvement comprising the step of including in the liquid a humectant selected from the group consisting of dialkyl phosphonates and dialkyl phosphites, and mixtures thereof.

2. The process of claim 1 wherein the humectant is diethyl ethylphosphonate.

3. The process of claim 1 wherein the humectant is dimethyl methylphosphonate.

* * * * *